United States Patent [19]
Chen

[11] Patent Number: 5,922,035
[45] Date of Patent: Jul. 13, 1999

[54] FUZZY LOGIC CONTROL SYSTEM FOR ELECTRICAL AIDED VEHICLE

[75] Inventor: Ping-Ho Chen, Tsing-Chu, Taiwan

[73] Assignee: Winston Hsu, Taiwan

[21] Appl. No.: 08/984,369

[22] Filed: Dec. 3, 1997

[51] Int. Cl.⁶ .......................... B62K 11/06; B62M 23/02; B62M 25/08
[52] U.S. Cl. ................................ 701/22; 701/52; 701/57; 701/93; 474/103; 474/110; 180/206
[58] Field of Search ................................. 701/22, 51, 52, 701/57, 59, 79, 93; 474/103, 110; 180/205, 206, 220

[56] References Cited

U.S. PATENT DOCUMENTS

| | | | |
|---|---|---|---|
| 4,364,448 | 12/1982 | Ikuma ........................................ | 701/93 |
| 5,356,348 | 10/1994 | Bellio et al. ............................... | 701/51 |
| 5,375,676 | 12/1994 | Takata et al. .............................. | 180/206 |
| 5,439,426 | 8/1995 | Nakashima ................................ | 701/57 |
| 5,570,752 | 11/1996 | Takata ....................................... | 180/206 |
| 5,728,017 | 3/1998 | Bellio et al. ............................... | 701/51 |
| 5,758,736 | 6/1998 | Yamauchi ................................ | 180/206 |
| 5,794,169 | 8/1998 | Jung et al. ................................. | 701/57 |
| 5,845,727 | 12/1998 | Miyazawa et al. ........................ | 180/205 |

Primary Examiner—Lissi Mojica
Attorney, Agent, or Firm—Winston Hsu

[57] ABSTRACT

A fuzzy logic control method for controlling an electrical motor aided, manually powered vehicle is disclosed which is used to assist a rider of the vehicle. The vehicle comprises a gear transmission for driving the vehicle, a manually powered operator for receiving a manual force inputted by the rider for manual operation of the gear transmission, a servo motor for generating a torque output, a reduction gear and a clutch for coupling the torque output of the motor to the gear transmission, a brake for reducing speed of the vehicle, a force sensor for sensing the manual force applied by the rider to the manually powered operator, a speed sensor for sensing speed of the vehicle, a brake sensor for sensing on and off of the brake; and a motor sensor for sensing output of the motor. The method comprises the following steps: (1) processing the outputs of the force sensor, speed sensor, brake sensor and motor sensor to generate a plurality of fuzzy variables; (2) evaluating the rider's satisfaction in various categories by using the fuzzy variables and generating a correspondent voltage output for each of the categories; (3) evaluating the rider's intention in each of the categories and generating a correspondent weighting factor for each category; (4) multiplying the voltage output of each category by its correspondent weighting factor; and (5) generating a voltage output according to the sum of all the weighted voltage outputs to control the servo motor to assist the rider.

20 Claims, 10 Drawing Sheets

FUZZY LOGIC CONTROL SYSTEM FOR ELECTRICAL AIDED VEHICLE

BACKGROUND OF THE INVENTION

This invention relates to an electrical aided bicycle, and more particularly, to a fuzzy logic control system of an electrical aided vehicle, such as elebike (electrical power aided bicycle).

Bike riders of conventional bikes may have difficulty in riding up a graveled hill or making a brake on a wet road surface. If electrical power can be added to assist a bike rider to drive his bike, the rider may easily drive his bike to reach an expected speed with very little human power consumed. This is an important advantage of elebikes. In addition to saving a rider's energy, an elebike is also expected to respond smoothly and intelligently when assisting a bike rider.

U.S. Pat. No. 5,474,148, invented by Nozomu Takata, discloses an elebike control method. It divides the speed of an elebike into several speed zones and each speed zone has a fixed electrical-to-manual torque ratio for feeding electric torque to the elebike. Such approach is not rider-adaptive since it can not sense a rider's attempt and adaptively output electrical power to assist the rider. Besides, it lacks riding smoothness due to the sine-wavelike resultant torque generated by coupling the electrical and manual torques.

SUMMARY OF THE INVENTION

It is therefore an objective of the present invention to provide a new fuzzy logic control system for an elebike which can sense a bike rider's attempt and adaptively output electrical power to assist the bike rider.

The present invention is based on a bike coupled with a fuzzy logic control system. A working model is described at first about pedal torque transmission. Then based on the application of a fuzzy logic control system, electrical elements such as battery, motor, electrical control unit, wheel RPM sensor, pedal torque sensor and brake sensor, are employed to generate a set of fuzzy variables as input to the fuzzy logic control system. An overall system block diagram is given in order to illustrate how it works in combining manual power and electrical power. Dynamic of a conventional bike is introduced about how a pedal force is transformed into an equivalent torque along the rear wheel shaft. The resultant torque, i.e. a combination of manual torque and electrical torque, is subject to the constraint of maximum allowable torque and maximum speed. How to find a working trajectory of the resultant torque under the constraint is based on the incorporated fuzzy rule sets of the fuzzy logic control system. Introduction of the fuzzy logic control of the present invention about fuzzification, inference and defuzzification is given with illustration and calculation. A two-level inference is given in order to find out the motion status of an elebike and then to apply the rules for acceleration inference, speed inference, or deceleration inference.

Figure 10:
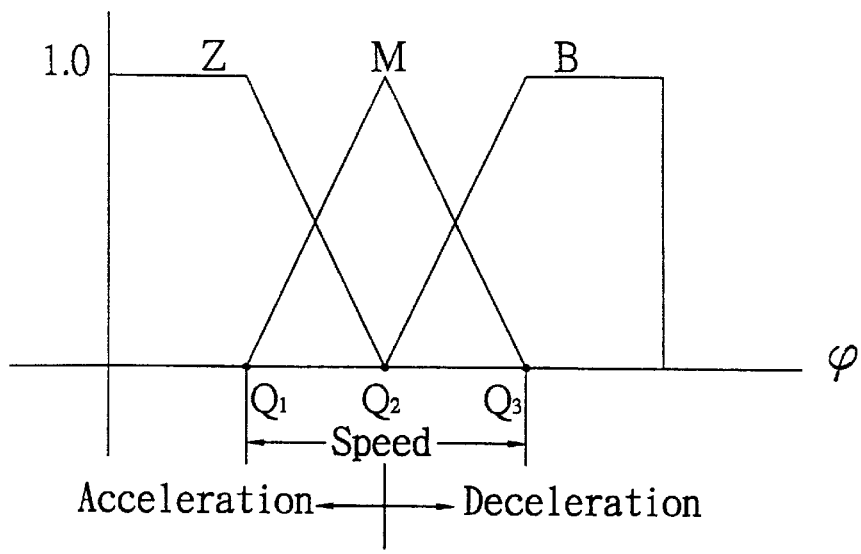
FIGS. 10–12 are membership functions of related fuzzy variables in the process of fuzzification.
Figure 11:
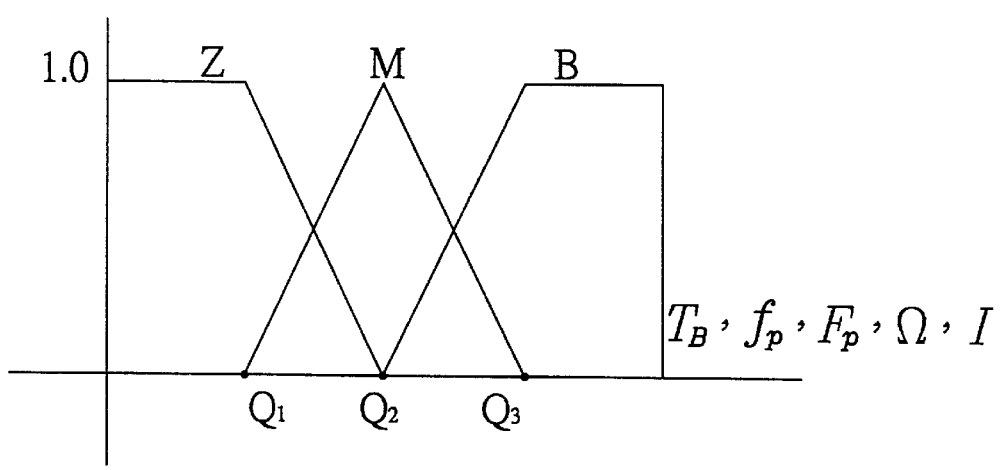
Figure 12:
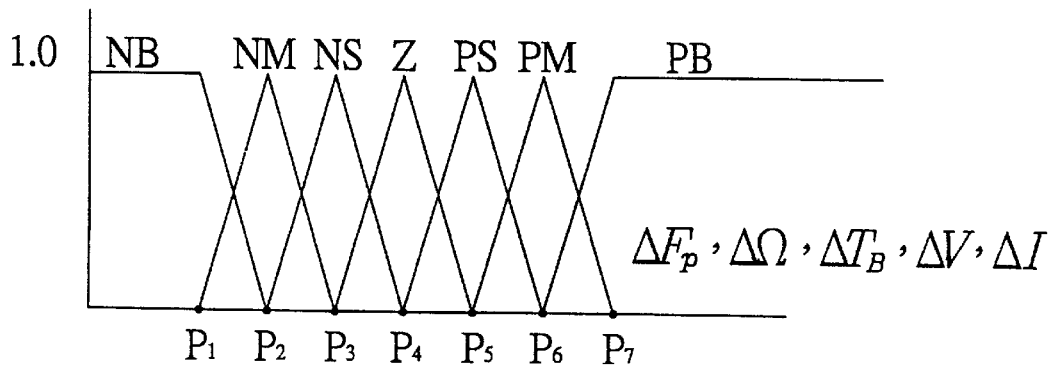

Table 1 shows the partition points of FIGS. 10–12.

Table 2 shows the normalization factors of FIGS. 10–12.

Figure 13:
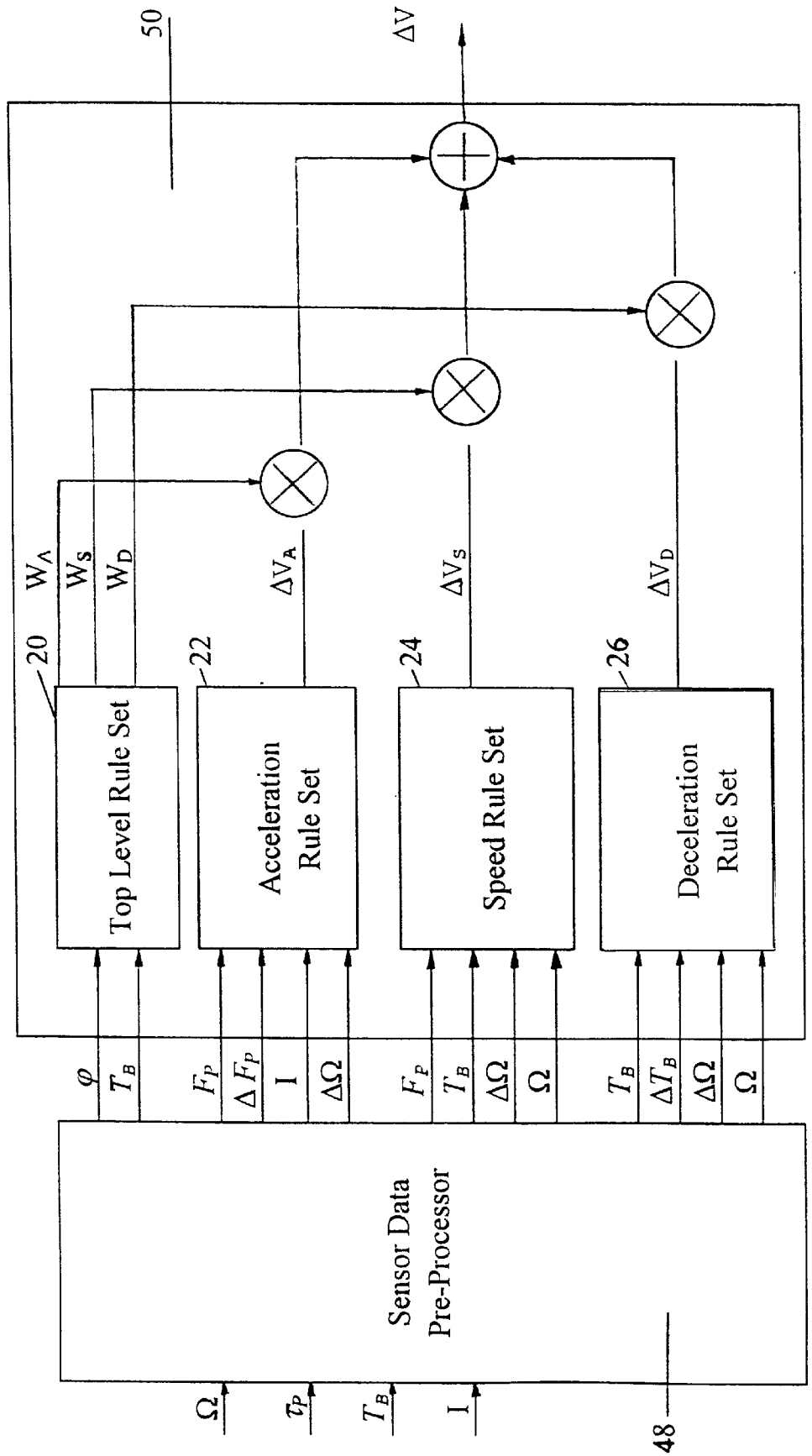
FIG. 13 is a two-level fuzzy inference scheme.

Table 3 shows the top level inference of the top level rule set shown in FIG. 13.

Table 4 shows the acceleration rule set shown in FIG. 13.

Table 5 shows the speed rule set shown in FIG. 13.

Table 6 shows the deceleration rule set shown in FIG. 13.

DETAILED DESCRIPTION OF THE PREFERRED EMBODIMENTS

Figure 1:
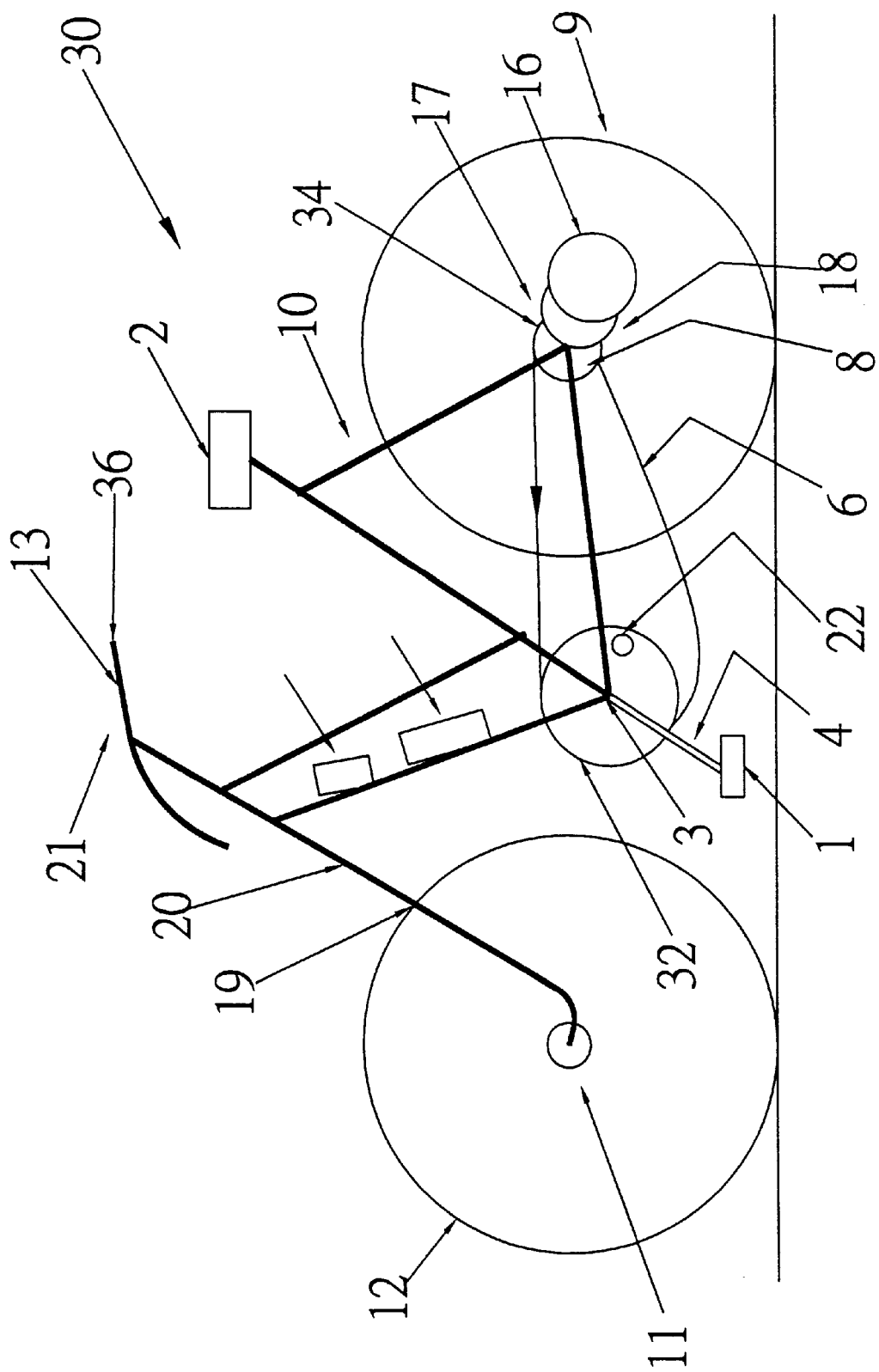
FIG. 1 is a diagrammatic view of an elebike according to the present invention.

Please refer to FIG. 1. FIG. 1 is a diagrammatic view of an elebike 30 according to the present invention. The elebike 30 comprises a frame assembly 10, a fork 20 installed at the front end of the frame assembly 10, a front wheel 12 rotatably installed over a front wheel shaft 11 at the lower end of the fork 20, a handle bar 21 installed at the higher end of the fork 20, a rear wheel 9 rotatably installed over a rear wheel shaft 8 at the rear end of the frame assembly 10, a seat 2 installed at a higher end of the frame assembly 10, a pedal assembly which is formed by two foot pedals 1, two crank arms 4 and a crank shaft 3, rotatably installed at a lower end of the middle portion of the frame assembly 10, a front sprocket 32 fixed to the crank shaft 3, a rear sprocket 34 connected to the rear wheel shaft 8, and a roller chain 6 installed between the front sprocket 32 and the rear sprocket 34. A brake 13 is installed at one end of the handle bar 21 for reducing the speed of the elebike 30.

When a rider is riding the elebike 30, a pedal force is applied to the pedal 1 which will generate a manual torque along the crank shaft 3 through the crank arm 4. The manual torque along the crank shaft 3 will create a tension over the roller chain 6 through the front sprocket 32 and generate a smaller torque over the rear wheel shaft 8. A thrust force for pushing the elebike 30 forward is generated by the smaller torque over the rear wheel shaft 8 at the contact point of the rear wheel 9 and the ground which will work against the resistant force caused by ground friction and also air dragging. The resultant force then torques the rear wheel shaft 8 to generate an angular acceleration over the rear wheel 9 and thus make the elebike 30 gain speed. Rolling of the rear wheel 9 on the ground is accompanied with a translation forward speed of the rear wheel shaft 8. Since the frame assembly 10 is a rigid body, the front wheel shaft 11 will also moves in the same translation forward speed. This transmission scheme is called manual torque reduction transmission.

For the electrical parts, the elebike 30 comprises a nickel-hydrogen (Ni—H) battery 14 and an electrical control unit (ECU) 15 mounted on the front portion of the frame assembly 10, a servo motor 16 preferably mounted on the rear end of the frame assembly 10 for driving the rear shaft 8, a reduction gear 17 affixed to the servo motor 16 for reducing angular speed to gain more torque, and a one-way clutch 18 for applying the thrust force from the reduction gear 17 to the rear wheel shaft 8 to move the elebike 30 forward. The one-way clutch 18 can be changed to a two-way clutch if power braking by using the servo motor 16 is required.

When using a two-way clutch to replace the one-way clutch 18, the control of the motor current I of the servo motor 16 must be carefully proceeded such as using a pulse train method to reduce the wheel speed instead of reversing the direction of the wheel rotation.

The elebike 30 further comprises a speed sensor 19 which has a magnet fixed to the rim of the front wheel 12 and a pick-up coil fixed to the front fork 20, for detecting rotation speed RPM (revolution per minute) of the front wheel 12, a brake sensor 36 installed under the brake 13 for sensing on and off of the brake 13, and a torque sensor 22 installed near the crank shaft 3 for measuring the manual torque created by a rider.

Figure 2:
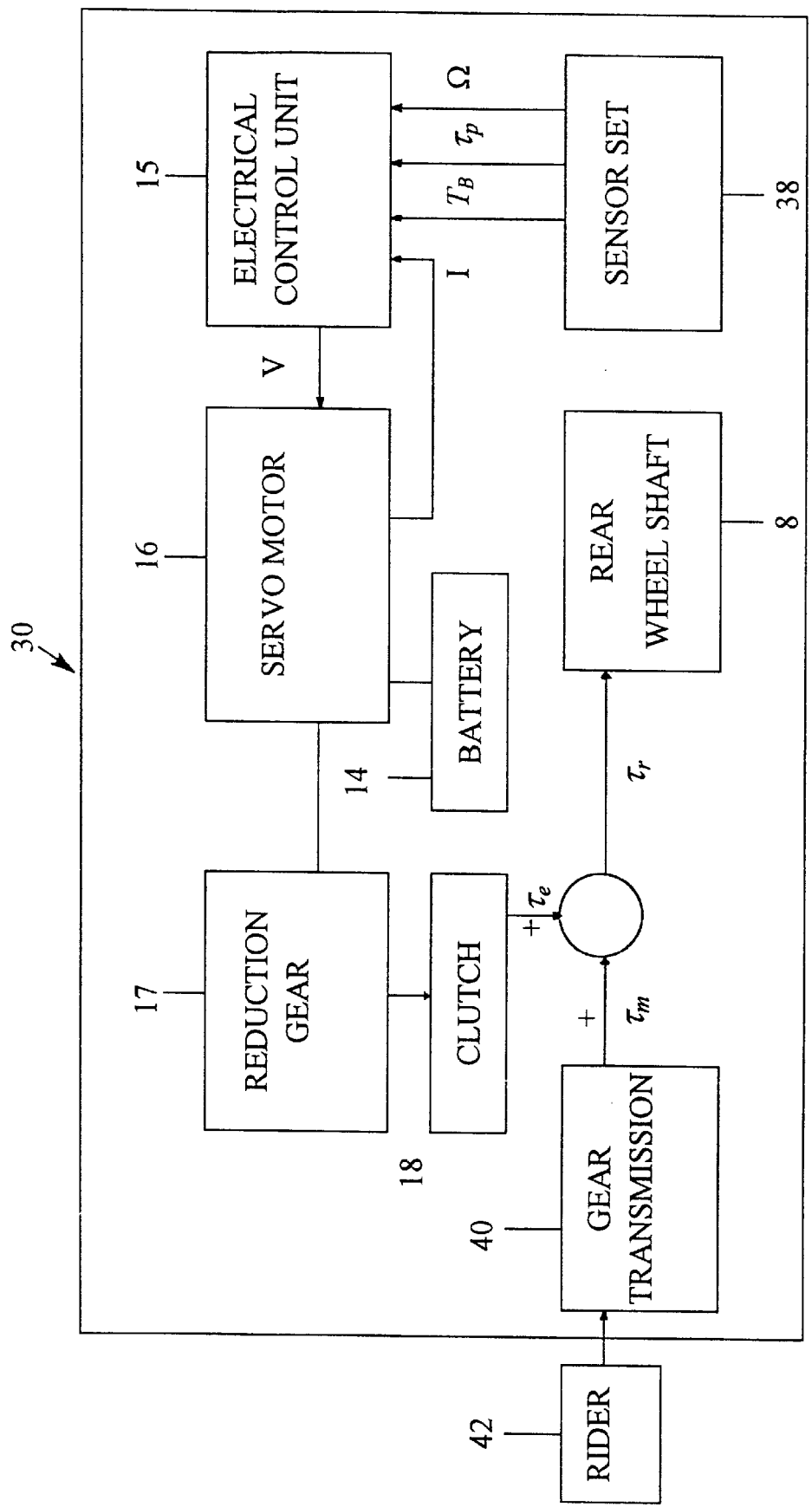
FIG. 2 is a system block diagram that shows a rider's manual torque and the electrical torque generated by a fuzzy logic control system.

FIG. 2 is a system block diagram of the elebike 30 shown in FIG. 1. The elebike 30 comprises a gear transmission 40 which is formed by the pedal assembly, the front sprocket 32, the roller chain 6 and the rear sprocket 34, for converting the pedal force created by the rider 42 over pedals 1 into manual torque $\tau_m$, a sensor set 38 which is formed by the brake sensor 36, the torque sensor 22 and the speed sensor 19, an ECU 15 for collecting signal outputs from the sensor set 38 and the motor current I as inputs and generating an output signal V for controlling the servo motor 16, a servo motor 16 for converting the electrical energy stored in the battery 14 into a torque output proportional to the output signal V of the ECU 15, a reduction gear 17 and a clutch 18 for applying the torque output of the servo motor 16 to the rear wheel shaft 8. Finally, the electrical torque $\tau_e$ transmitted from the clutch 18 is coupled with the manual torque $\tau_m$ and becomes the resultant torque $\tau_r$ which is applied to the rear wheel shaft 8.

The ECU 15 collects the motor current I from the servo motor 16 and the following signal outputs from the sensor set 38:

1. brake duration $T_B$ from the brake sensor 36,
2. pedal torque $\tau_p$ from the torque sensor 22, and
3. wheel rotation speed $\Omega$ from the speed sensor 19 and generates an output signal V for controlling the servo motor 16. The torque output developed by the servo motor 16 is mechanically amplified by the reduction gear 17 and becomes the electrical torque $\tau_e$ which is transmitted to the rear wheel shaft 8 by the clutch 18 when the clutch 18 is on.

When assisting a rider to drive the elebike 30, the ECU 15 will try to evaluate the rider's intention and then use the output signal V to adaptively drive the servo motor 16 to assist the rider. How to evaluate a rider's intention will be discussed below.

For any rider, if a big pedal force is sensed by the torque sensor 7, it implies that the rider may have the following intentions:

1. accelerate the elebike 30 to a high speed on a graveled up-hill road,
2. accelerate the elebike 30 to a medium speed on a graveled up-hill road, or
3. accelerate the elebike 30 to a high speed on a paved concrete road.

Further questions are brought up from the above three intentions:

1. What is the final speed that the rider expects to have?
2. How long will it take to reach the expected final speed?
3. What is the pedal torque needed to reach the expected final speed within the expected time frame?
4. If the pedal torque provided by the rider is not big enough to reach the expected final speed in time, how much electrical torque should be added?
5. After the elebike 30 reaches the final speed as expected, is the rider satisfied with the performance of the elebike 30 such as riding smoothness?

The ECU 15 uses fuzzy logic to evaluate and assist a rider to reach the three working targets mentioned above, i.e. expected final speed, expected response time and riding smoothness, according to signals inputted to the ECU 15. And this will be described in FIG. 3.

Figure 3:
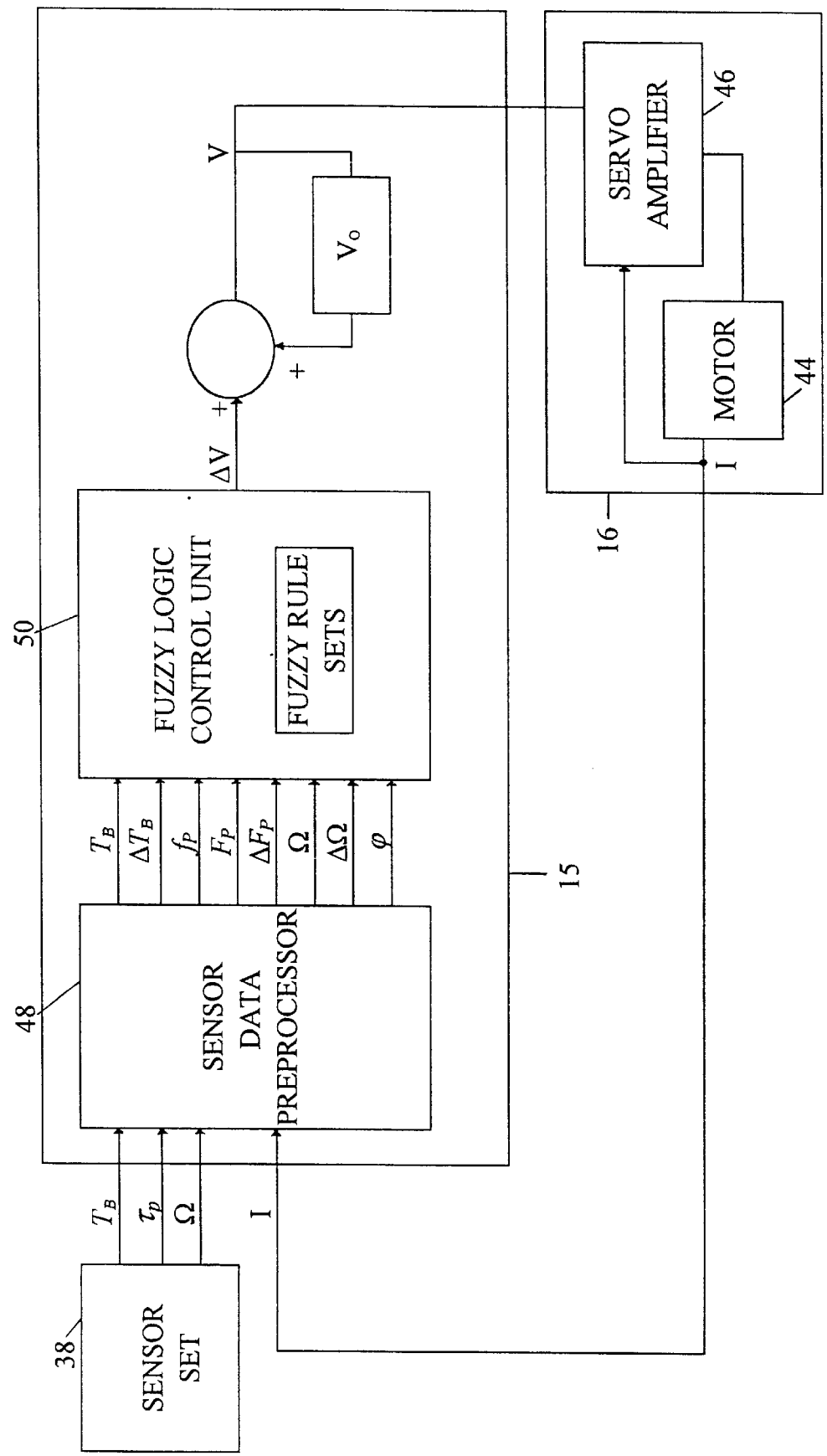
FIG. 3 is a system block diagram of the fuzzy logic control system according to the present invention.

Please refer to FIG. 3. FIG. 3 shows a system block diagram of the fuzzy logic control system of the elebike 30. The voltage output V of the ECU 15 is used to control the servo motor 16, and the output signals of the sensor set 38 and the motor current I are used as input signals by the ECU 15 to generate the voltage output V. The voltage output V of the ECU 15 represents the intended torque which should be generated by the servo motor 16. The servo motor 16 comprises a brushless servo torque motor 44 and a servo amplifier 46. The servo amplifier 46 uses the motor current I to calculate the real torque output of the servo motor 16 and compares it with the intended torque output which is calculated by using the voltage output V of the ECU 15. The difference of the comparison is then used to drive the motor 44 so that it can modify its torque output to approach the intended torque output.

After applying a pedal force to a pedal 1 of the elebike 30, the rider 42 will immediately assess the speed and speed change of the elebike 30. This assessment will be used by the rider 42 to adjust the pedal force of the following steps. The current speed of the elebike 30, compared with the expected final speed within the rider's mind, leads to a positive speed difference which implies more resulting torque $\tau_r$ along the rear wheel shaft 8 is needed. This is the reason why the signal output of the speed sensor 19 is used by the ECU 15 to observe the wheel rotation speed $\Omega$ and speed change $\Delta\Omega$ of the elebike 30.

After the rider 42 assesses the speed and speed change of the elebike 30 and makes the decision, the rider 42 applies a second pedal force to another pedal 1 of the elebike 30. From the output of the torque sensor 22, the ECU 15 will observe the pedal torque $\tau_p$ generated by the first pedal force and its change $\Delta\tau_p$ from the second pedal force. The output of the torque sensor 22 is analogue signals which will be converted into digital signals by the ECU 15 before any calculation.

If the pedal torque is not sufficient as judged by the fuzzy logic of the ECU 15, the ECU 15 will then make a decision to assist the rider 42 by increasing the voltage output V. A voltage increment $\Delta\Omega$ will be summed up with a previous voltage output $V_o$ to drive the servo motor 16. The voltage increment $\Delta V$ is depended on the difference to the working targets. Since the output torque of the servo motor 16 is proportional to the motor current I by a torque constant Kt, the ECU 15 measures the motor current I to obtain the output torque of the servo motor 16. The motor current I can be measured by using a low-resistance resistor connected in series with the winding of the servo motor 16. By measuring the voltage drop across the resistor, the motor current I can be obtained by the ECU 15.

After the fuzzy logic control unit 50 of the ECU 15 collects all the aforementioned data by using a sensor data preprocessor 48 which includes the pedal torque $\tau_p$ and its change $\Delta\tau_p$, wheel rotation speed $\Omega$ and its change $\Delta\Omega$, motor current 1, and the brake duration $T_B$ from the brake sensor 36, the fuzzy logic control unit 50, with a plurality of fuzzy rule sets 51 stored in a non-volatile memory of the ECU 15, can generate the voltage increment $\Delta V$. The voltage increment $\Delta V$ will be coupled with a previous voltage output $V_o$ stored in memory to form the output voltage V to drive the servo motor 16.

Figure 4:
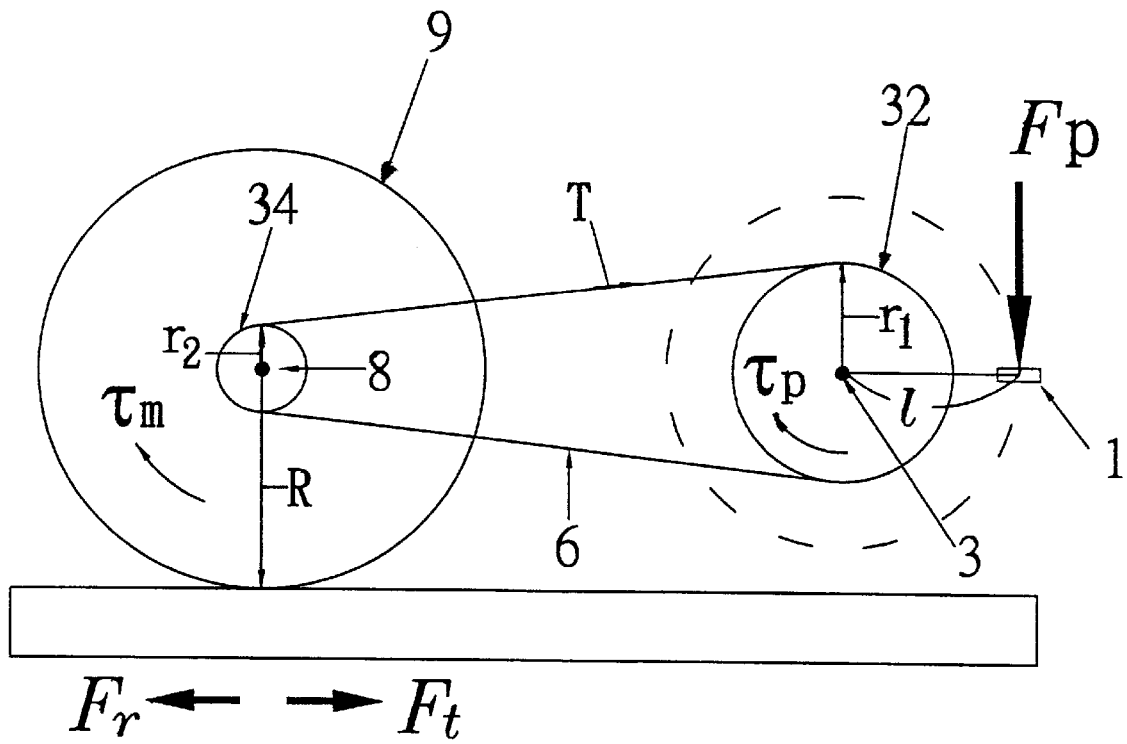
FIG. 4 is a pedal force transmission diagram which shows how a thrust force is generated by a pedal force.

Please refer to FIG. 4. FIG. 4 is a pedal force transmission diagram which shows how the thrust force $F_\tau$ is generated by the pedal force $F_P$. According to the system block diagram shown in FIG. 2, the relationship between the pedal force $F_P$, the torque $(r_1/r_2) F_P$ l transmitted to the rear wheel shaft 8, the rotation speed $\Omega$ of the rear wheel 9, and the translation forward speed v of the elebike 30 is illustrated in FIG. 4 with the mathematical equations given as follows:

$$F_p l = T r_1$$

$$T r_2 = R F_t$$

$$F_r = F_A + F_D + F_S$$
$$= K_A v^2 + K_D v + \mu_r W_B$$

$$F_t - F_r = m\overset{\circ}{v}$$

$$v = \Omega R$$

where $F_P$: Pedal force

T: Tension of roller chain 6

$F_t$: Thrust force $F_r$: Resistant friction force $F_A$: Air drag force $F_D$: Dynamic friction force $F_S$: Ground static friction force v: Speed of elebike 30

$\Omega$: Angular speed of rear wheel 9

$W_B$: Full load of elebike 30

$r_1$: Radius of front sprocket 32

$r_2$: Radius of rear sprocket 34

R: Radius of rear wheel 9 l: Length of crank arm 4

$\mu_r$: Static friction coefficient.

$K_A$: Air drag coefficient $K_D$: Dynamic friction coefficient

Figure 5:
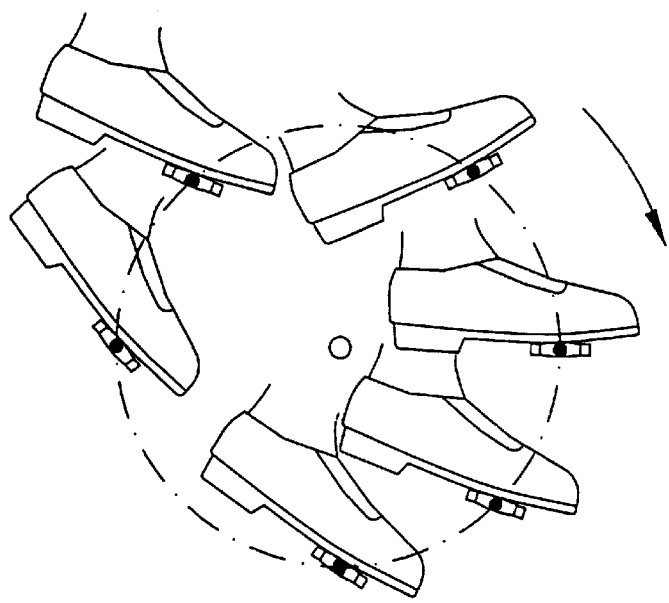
FIGS. 5–7 show a manual torque generation curve with respect to crank arm angular position.
Figure 6:
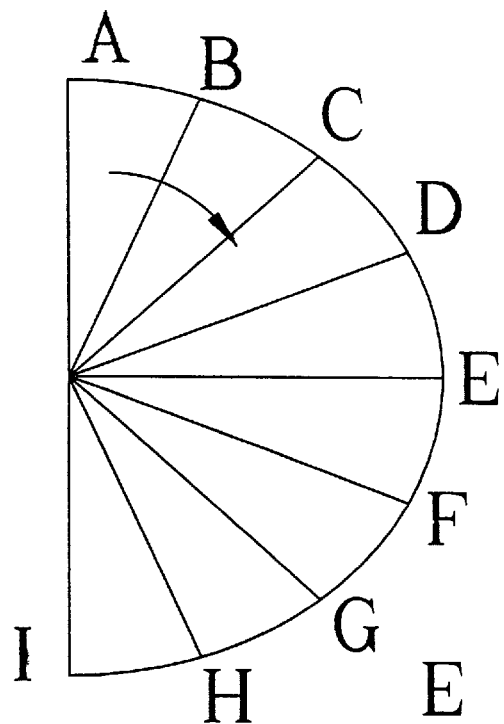
Figure 7:
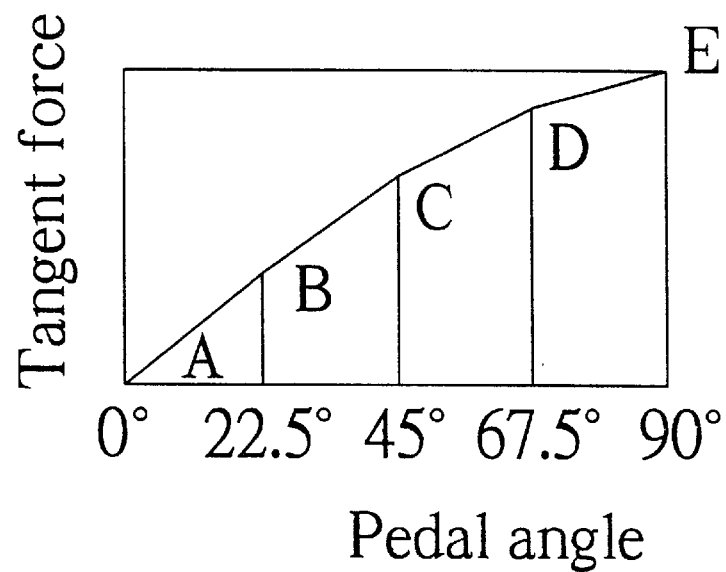

The transformation from the pedal force $F_P$ to the pedal torque $\tau_p$ is illustrated in FIGS. 5–7 and described as follows.

Theoretically, the pedal torque $\tau_p$ is generated by the pedal tangential force multiplied by the length l of the crank arm 4. Since the pedal force $F_P$ is constantly in downward direction, it will generate a pedal torque $\tau_p$ of sine-wave-like curve as shown in FIG. 7. The shaded area shown in FIG. 7 encourages most of the electrical torque $\tau_e$ shown in FIG. 2 to be placed here in order to reduce torque ripple and make riding more smoothing. This is a way of thinking to use the complementary idea to equalize the torque curve as if it were a full wave rectifier. Note that the right pedal force constructs one positive half wave while the left pedal force constructs another positive half wave. Therefore, one rotation cycle of the crank arm 4 will introduce two positive half waves. In other word, one mechanical crank cycle corresponds to two electrical cycles of the torque sensor 22.

Figure 8:
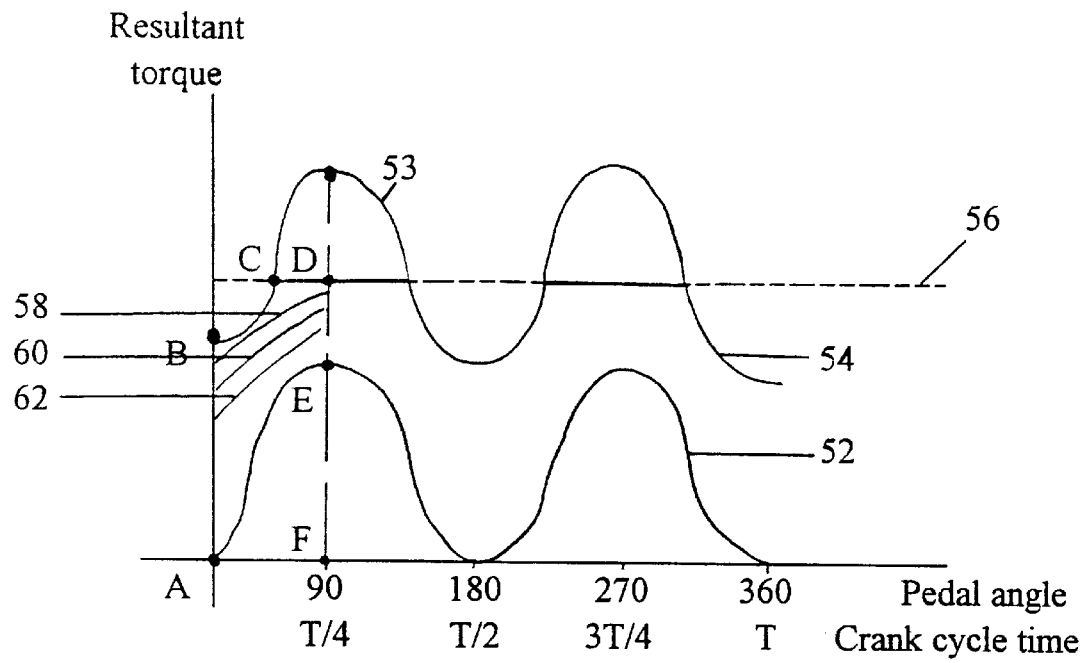
FIG. 8 is a curve of the resultant torque, as a sum of manual torque and electrical torque, with respect to crank angular position.

Since there exists a boundary to limit the maximum torque due to the structure of the mechanical member and to limit the maximum speed (say 40 Km/hr) for a typical elebike rather than a sports bike, an allowable working region in a figure which shows resultant torque v.s. pedal angle (or crank cycle time) of a typical elebike is illustrated in FIG. 8. In FIG. 8, it indicates a maximum manual torque curve 52 coupled with a maximum electrical torque curve 53 above the manual torque curve 52 which form a resultant torque curve 54. It is obvious that the resultant torque curve 54 is intercepted by an allowable maximum torque line 56. Therefore, the area enclosed by A,B,C,D,E is the maximum possible area for the electrical torque to apply but subject to the constraint that the area of ABCDEF should be less than the maximum allowable speed. If the area of ABCDEF is larger than the maximum allowable speed, it is necessary to draw a set of working curves, say curve 58, curve 60, curve 62, and so on to meet the speed limit. How to select one of the working curves also depends on the satisfaction of the rider. In other word, if the rider is not satisfied with the final speed as given by the area underneath the curve 62, the fuzzy logic control unit 50 of the ECU 15 will automatically shift from the curve 62 to the curve 60 or 58.

Figure 9:
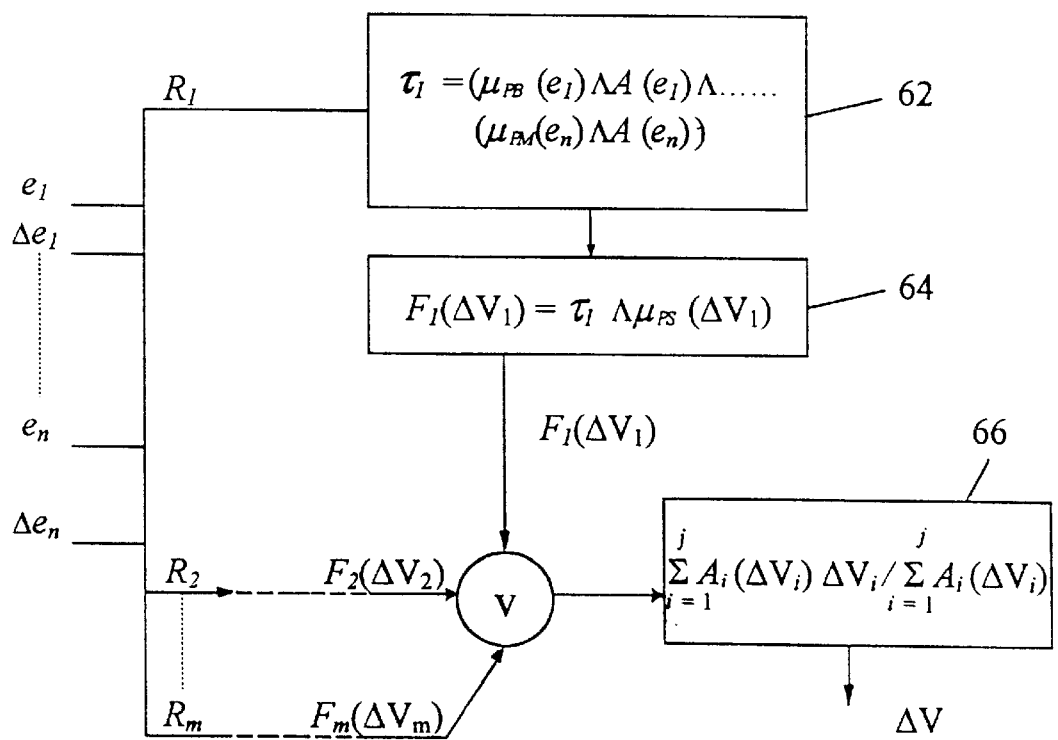
FIG. 9 is a fuzzy logic control algorithm that shows pre-processed input fuzzy variables and output voltage increment for motor excitation.

FIG. 9 is a fuzzy logic control algorithm that shows the pre-processed input fuzzy variables $e_1$, $\Delta e_1$ to $e_n$, $\Delta e_n$, and output voltage increment $\Delta V$ for motor excitation.

As to the structure of fuzzy logic control unit 50 of the ECU 15 shown in FIG. 3, FIG. 9 shows the scheme of fuzzy processing which includes pre-processed input fuzzy variables $e_1$, $\Delta e_1$ to $e_n$, $\Delta e_n$, from the sensor data preprocessor 48 and output voltage increment $\Delta V$ for motor excitation. The following description is applicable to each rule $R_1$ to $R_m$ shown in FIG. 9:

1. Fuzzification:

Membership functions of input fuzzy variables, partition point, and normalization will be introduced later.

2. Inference:

Each membership function, e.g. $\mu_{PB}, \mu_{PM}$, etc. in rule $R_1$, related to each rule, is to intercept a set of its fuzzy variable (say, wheel speed change $\Delta\Omega$) at various time called singleton $A(e_j)$, (j=1~n), and to find the minimum with the membership function to acquire a linguistic contribution value.

All the minimum linguistic contribution values (say, the pedal force $F_P$ and its change $\Delta F_P$, wheel speed $\Omega$ and its change $\Delta\Omega$, the motor current I) obtained from the above process, are to be found their common minimum that is called degree of fire (DOF) $\tau_1$, as shown in block 62

The common minimum linguistic contribution value $\tau_1$ is to intercept the membership function $\mu_{PS}$ of the voltage increment $\Delta V_1$, as shown in block 64, and to find an area $F_1$ $(\Delta V_1)$ bounded by that common minimum linguistic contribution value $\tau_1$.

3. Defuzzification:

Find an union from the area of linguistic quantifier of the voltage increment in each rule, i.e. $F_1(\Delta V_1)$ to $F_m(\Delta V_m)$, and then use weighting moment approach, as shown in block 66, to find the center of area of that union.

The center of area is the resultant voltage increment $\Delta V$ that is to be summed up with the previous voltage output $V_{o\,o}$ as shown in FIG. 3. The resultant voltage V is the excitation to the servo motor 16.

The detail of fuzzification is given as follows. The fuzzy variables are defined at first:

Pedal force $F_P$, its change $\Delta F_P$ and frequency $f_P$

Handle brake time occupation $T_B$ and its change $\Delta T_B$

Wheel speed $\Omega$ and its change $\Delta \Omega$

Motor current I, $\Delta$I and voltage V, $\Delta$V.

The membership functions of the above fuzzy variables are given in FIGS. 10–12 with $Q_1 \sim Q_3$ and $P_1 \sim P_7$ as partitions. A partition assignment table which defines the fuzzy subsets of each fuzzy variable is shown in Table 1 and Table 2 (to be introduced later on).

In FIGS. 10–12, the notations are defined as follows:

Z: Zero

B: Big

NM: Negative Medium

PS: Positive Small

PB: Positive Big

M: Medium

NB: Negative Big

NS: Negative Small

PM: Positive Medium

In FIG. 10, the membership functions of the fuzzy variable "$\phi$" is given. The fuzzy variable "$\phi$" is a motion status index for judging the status of motion dynamic which shows whether it is in acceleration, constant speed or deceleration. The fuzzy variable "$\phi$" is defined as follows:

$$\varphi = \frac{\Omega - f_{PE}}{\Omega}$$

$$f_{PE} = R_G f_P / 2$$

where $\Omega$ (RPS) is expressed by the number of circles per second for the wheel rotation. $R_G$ is gear ratio $N_1/N_2$ of the front sprocket 32 and the rear sprocket 34, $f_{PE}$ (Hz) is the equivalent frequency of the pedal force $F_P$ transformed to the rear wheel shaft 8.

Note that the pedal mechanism shown in FIG. 4 works as if it were a two-stroke engine so that two strokes of the pedal 1 are counted as one circle of the crank shaft 3.

In FIG. 11, fuzzy variables of the given membership functions are $T_B, f_P, F_P, \Omega$ and I. In FIG. 12, fuzzy variables adaptive to the membership functions are $\Delta F_P, \Delta \Omega, \Delta T_B, \Delta V, \Delta I$.

As to the partition assignment, Table 1 shows a typical way to assign the partition points. As to the normalization for the membership function, a calculation process is given as follows.

As schemed, the normalization factor of fuzzy variables is the possible maximum values of each fuzzy variable as found below. In FIGS. 10 and 11, the normalization factors for all the fuzzy variables are calculated based on the following given conditions:

Bike speed limit: v(max)=36 Km/hr=10 m/s

Effective radius of wheel: R=0.3 m

Total resistant force (air dragging, ground friction):
    $F_r$=2.5 Kgf

Pedal crank length: l=0.165 m

For the case of low gear ratio with

Number of teeth of front sprocket 32: $N_1$=44

Number of teeth of rear sprocket 34: $N_2$=19 it follows,

Wheel rotation speed: (case of no slip)
    $\Omega$(max)=v/R=5.3 (cps)
    Gear ratio: $R_G = N_1/N_2 = 2.32$ Frequency of crank shaft 3
    $f_{PS}$ (max)=$\Omega$ (max)/$R_G$=2.3 (cps)

Frequency of pedal force:
    $f_P$ (max)=2 $f_{PS}$ (max)=4.6 (cps)

Power: P=$F_r$ =25 Kgf m/s=0.3 HP

Pedal force:
    $F_P$ (min)=P/$\Omega$ (max)=10.5 Kgf.

Similarly, for another case of low frequency of crank shaft 3 rotation:
    $f_{PS}$ (min)=0.5 (cps)

it follows,
    $\Omega$ (min)=1.15 (cps) (case of no slip)
    $f_P$ (min)=2 $f_{PS}$ (min)=1.0 (cps)
    $F_P$ (max)=P/$\Omega$ (min)=48 Kgf.

For the case with slip in deceleration while braking:
Time occupation of handle brake:
    $T_B$ (max)=1.5 sec.

In FIG. 12, $\Delta T$ $T_B$=1.5 sec $\Delta F_P$=24 Kgf $\Delta \Omega$=2.65 (cps)

$\Delta V$=18 volt, for V (max)=36 volt $\Delta I$=3 amp, for I (max)=6 amp

Based on the above calculation, Table 2 is obtained to show the maximum values of all the fuzzy variables. This is the normalization process.

In the inference, fuzzy rules are composed of two-level rule sets, i.e. top level rule set 70 and bottom level rule sets 72, 74 and 76 as given in FIG. 13. The top level rule set 70 fuzzily judges that the dynamic motion status of the elebike 30 is in acceleration, speed or deceleration. The bottom level rule sets comprise three rule sets, i.e. acceleration rule set 72, speed rule set 74 and deceleration rule set 76. The motor voltage output of each bottom level rule set, i.e. $\Delta V_A, \Delta V_S, \Delta V_D$, is then multiplied by the weighting factor $W_A, W_S$ or $W_D$ generated by the top level rule set 70. Eventually, the motor voltage output $\Delta V$ is constructed by finding the union of each weighted motor voltage output.

As to the top level rule set 70 in the two-level scheme in FIG. 13, the top level inference in Table 3 decides the weighting of various bottom level rule sets. Each rule has a remark to indicate its road condition by the following notation:

M: Motion status

S: Speed

DH: Down hill

G: Ground

P: Paved

B: Brake

D: Deceleration

A: Acceleration

UH: Up hill

Gr: Graveled

C: Concrete

Note that in Table 3 the output of the top level inference is M which means motion status. M is defined as a vector <$W_A, W_B, W_C$>. The sum of the three weighting factors $W_A$, $W_B$ and $W_C$ is equal to 1. For instance, the vector M in Table 3 may be assigned as <1.0,0.0,0.0> in rule 7, and <0.9,0.1, 0.0> in rule 6 and so on.

As to the bottom level rule sets, the acceleration rule sets 72 is introduced first as follows.

The fuzzy variable inputs of the acceleration rule set 72 include motor current I, increment of wheel rotation speed $\Delta \Omega$, pedal force $F_P$ and its increment $\Delta F_P$. The output just involves the increment of voltage $\Delta V_A$. Based on the idea of "torque increment proportional to estimated speed rate error", the governing law of the acceleration rule set 72 is given as follows.

$$\Delta F_P + K_1 \Delta V_A = K_2(F_P + K_3 I - K_4 \Delta \Omega)$$

Figure 14:
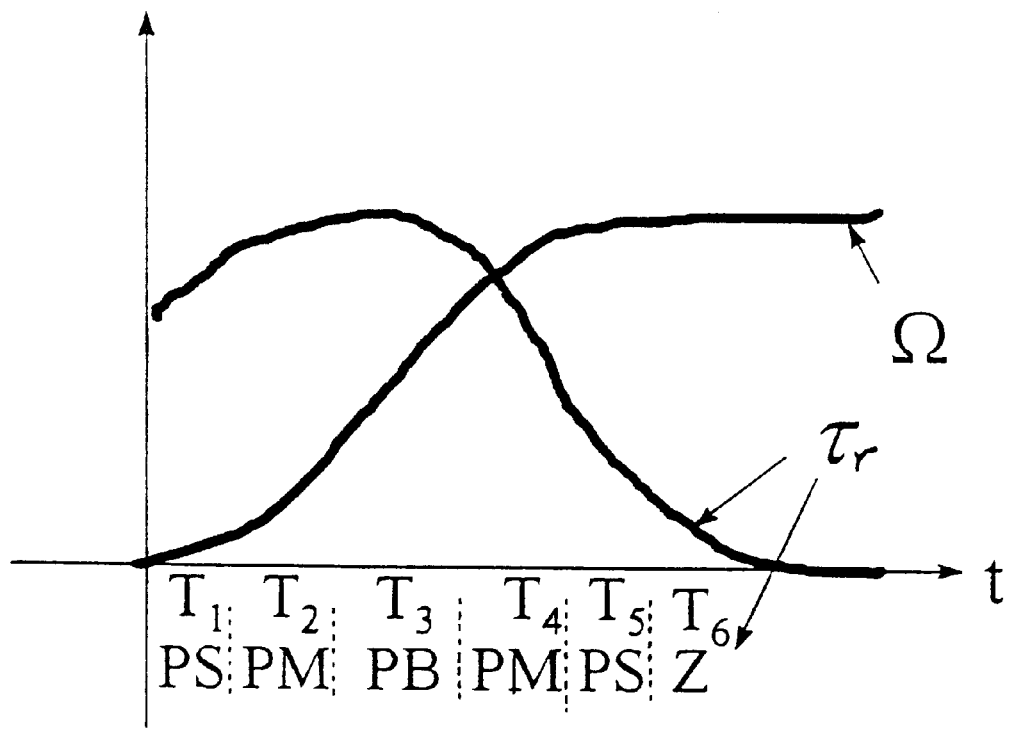
FIG. 14 is a speed curve and a resultant torque curve of an acceleration mode.

The speed curve and its acceleration curve are given in FIG. 14 that shows the degree of acceleration varies with the time. Based on the acceleration governing law shown above and the speed and acceleration curves shown in FIG. 14, the acceleration rule set 72 is thus listed in Table 4. There are 18 rules that cover three cases, i.e. no aided power, paved or concrete road, and up-hill gravel road.

The bottom level speed rule set 74 shown in Table 5 is introduced as follows.

Smoothness is of great concern in speed riding status.

Average speed $\Omega_{AVE}$ is monitored to find the speed error $e_\Omega$ and $\Delta e_{106}$ as well:

$$e_\Omega = (\Omega - \Omega_{AVE})/\Omega_{AVE}$$

$$\Delta e_{106} = \Delta \Omega / \Omega_{AVE}$$

Figure 15:
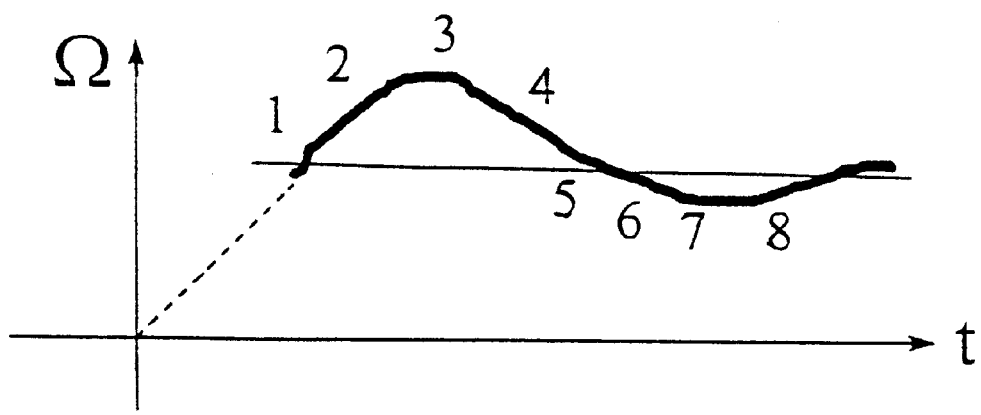
FIGS. 15–16 are phase plane diagrams of a speed mode.
Figure 16:
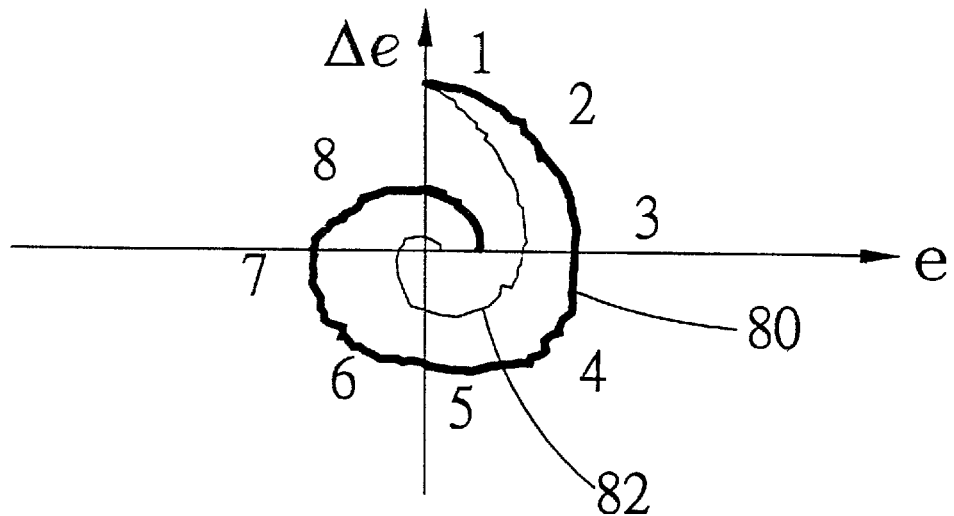

An important concept involves in the speed rule set 74 is damping in order to eliminate or reduce the motion oscillation. FIGS. 15–16 show such an idea. The damping curves 80 and 82 shown in FIG. 16 are rider-dependent.

The bottom level deceleration rule set 76 shown in Table 6 is finally introduced as follows.

When making a brake, the rotation of a bike wheel is to be stopped while the bike body is still moving forward with a speed v. In such a condition, a slip factor S is defined as:

$$S = (v - v_W)/v_W$$

where $v_W$ is the target speed of the bike wheel.

Figure 17:
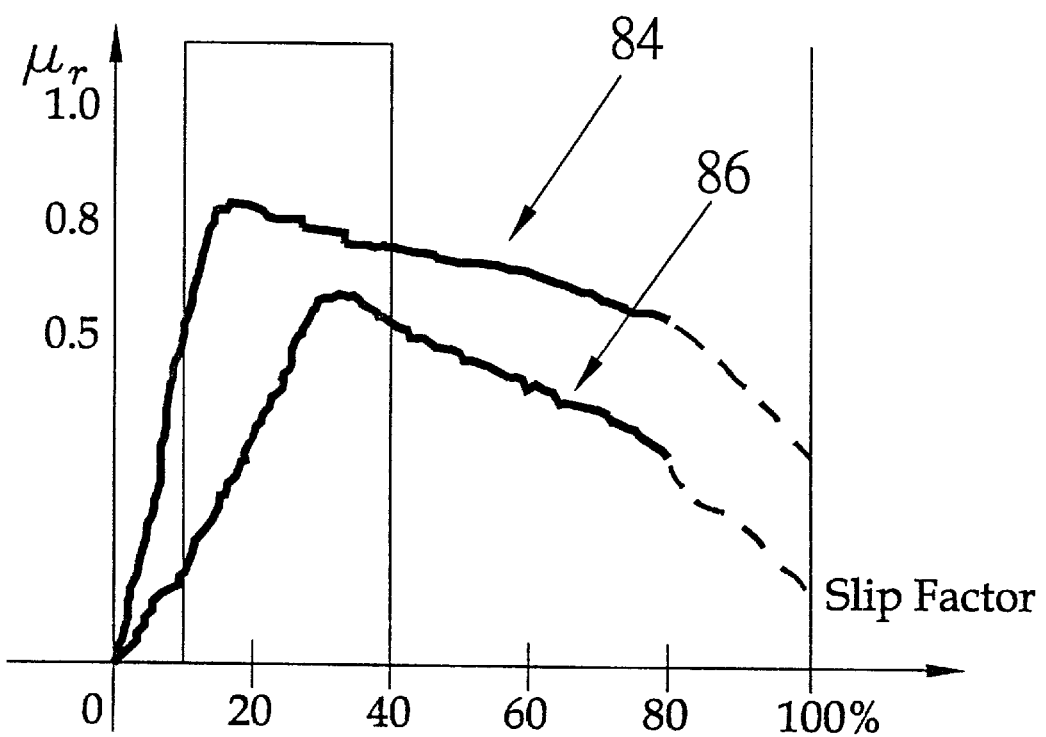
FIG. 17 is a curve of ground friction coefficient with respect to an elebike slip.

FIG. 17 shows that the maximum friction coefficient $\mu_r$ happens at 0.15 slip factor for curve 84 which represents a dry concrete ground condition and 0.28 slip factor for curve 86 which represents a wet paved road condition. Since maximum friction is needed while braking, the shaded area in FIG. 17 represents an appropriate control range around 0.2 slip factor. The control law is given as follows:

$$\epsilon = (v/v_W) - 1.2 = (v/R\Omega) - 1.2$$

$$\Delta \epsilon = (\Delta v/v) - (\Delta v_W/v_W)$$

where $\epsilon$ and $\Delta \epsilon$ are sensed by brake duration $T_B$ and its increment $\Delta T_B$ respectively. Table 6 shows 18 rules of the deceleration rule set 76 for generating the motor voltage output $\Delta V_D$.

To tune up the fuzzy logic control (FLC) scheme, five approaches are recommended, i.e. to adjust membership functions, partitioning, normalization factors, inference rules and defuzzification.

The gain Ki(i=1~4) of the acceleration governing law shown above can be tuned up, i.e. the weighting factors, the gain Ki(i=1~4) and its associated rules may be adjusted. This is a feasible method to smooth the hyper plane of the output voltage $\Delta V$ with respective to all the input fuzzy variables.

As to a variety of riders, i.e. male, female, old, young and loaded, normalization factors may be tuned. For meeting various kinds of ground conditions, i.e. gravel, bump, concrete and paved road, partitioning and membership functions may be adjusted.

The present invention concerning the fuzzy logic control applied to elebike control is not limited to the working model as described above. It means more modification may be made. For instance, the number of rules may be reduced or increased depending on the cost and engineering consideration. Sensors for generating the fuzzy variables may be mounted at different locations. The number of the sensors as mentioned above may be increased or reduced based on various requirements.

TABLE 1

| | | | Partition points | | | | | | |
|---|---|---|---|---|---|---|---|---|---|
| $Q_1$ | $Q_2$ | $Q_3$ | $P_1$ | $P_2$ | $P_3$ | $P_4$ | $P_5$ | $P_6$ | $P_7$ |
| 0.2 | 0.5 | 0.8 | −0.8 | −0.5 | −0.2 | 0 | 0.2 | 0.5 | 0.8 |

TABLE 2

| | | | | Normalization factors | | | | | |
|---|---|---|---|---|---|---|---|---|---|
| I | $\Omega$ | $f_p$ | $F_P$ | $T_B$ | $\Delta T_B$ | $\Delta F_P$ | $\Delta \Omega$ | $\Delta V$ | $\Delta I$ |
| 6 | 5.3 | 4.6 | 48 | 1.5 | 1.5 | 24 | 2.56 | 18 | 3 |

TABLE 3

Top level inference

| | IF | | THEN | |
|---|---|---|---|---|
| Rule | $\phi$ | $T_B$ | M | Remark |
| 1 | B | B | D | DH, B |
| 2 | B | M | D | G, B |
| 3 | B | S | S | Gr, S |
| 4 | M | M | S | C, S |
| 5 | M | S | S | P, S |
| 6 | S | M | A | Gr, A. |
| 7 | S | S | A | UH, A. |

TABLE 4

Acceleration rule set

| | IF | | | | THEN | |
|---|---|---|---|---|---|---|
| Rule | $F_P$ | I | $\Delta F_P$ | $\Delta \Omega$ | $\Delta V$ | Remark |
| 1 | PS | Z | PS | PS | Z | N, 1 |
| 2 | PM | Z | PM | PM | Z | N, 2 |
| 3 | PB | Z | Z | PB | Z | N, 3 |
| 4 | PM | Z | NM | PM | Z | N, 4 |
| 5 | PS | Z | NS | PS | Z | N, 5 |
| 6 | Z | Z | Z | Z | Z | N, 6 |
| 7 | PS | Z | PS | Z | PS | P, C, 1 |
| 8 | PM | PS | PM | PS | PM | P, C, 2 |
| 9 | PB | PM | Z | PM | Z | P, C, 3 |
| 10 | PS | PM | NM | PS | NS | P, C, 4 |
| 11 | PS | PS | NS | PS | Z | P, C, 5 |
| 12 | Z | PS | Z | Z | Z | P, C, 6 |
| 13 | PM | PS | PM | Z | PM | G, U, 1 |
| 14 | PB | PM | Z | PM | PM | G, U, 2 |
| 15 | PB | PB | Z | PB | Z | G, U, 3 |
| 16 | PM | PB | NB | PM | NM | G, U, 4 |
| 17 | PS | PM | NM | PS | NS | G, U, 5 |
| 18 | Z | PM | Z | Z | Z | G, U, 6 |

TABLE 5

Speed rule set

| Rule | IF | | THEN | Remark |
|---|---|---|---|---|
| | e | Δe | ΔV | |
| 1 | Z | PB | NM | 1 |
| 2 | PM | PM | NB | 2 |
| 3 | PB | Z | NM | 3 |
| 4 | PM | NM | NS | 4 |
| 5 | Z | NB | PM | 5 |
| 6 | NS | NM | PM | 6 |
| 7 | NM | Z | PM | 7 |
| 8 | NS | PS | PS | 8 |

TABLE 6

Deceleration rule set

| | ΔT$_B$ | | | | | | |
|---|---|---|---|---|---|---|---|
| T$_B$ | NB | NM | NS | Z | PS | PM | PB |
| S | Z | Z | NS | NS | NM | NM | NB |
| M | Z | NS | NS | NM | NM | NB | NB |
| B | NS | NS | NM | NM | NB | NB | NB |

What is claimed is:

1. An electrical motor aided, manually powered vehicle comprising:
   a gear transmission for driving the vehicle;
   a manually powered operator for receiving a manual force inputted by a rider for manual operation of the gear transmission;
   a servo motor for generating a torque output;
   coupling means for coupling the torque output of the motor to the gear transmission;
   a brake for reducing speed of the vehicle;
   a force sensor for sensing the manual force applied by the rider to the manually powered operator;
   a speed sensor for sensing speed of the vehicle;
   a brake sensor for sensing on and off of the brake;
   a motor sensor for sensing output of the motor; and
   an electric control unit for processing the outputs of the force sensor, speed sensor, brake sensor and motor sensor according to a plurality of fuzzy rule sets and generating a voltage output to adaptively drive the servo motor to assist the rider.

2. The vehicle of claim 1 wherein the control unit comprises a memory for storing a previous voltage output of the control unit and a fuzzy logic control means for generating a voltage output by using the fuzzy rule sets wherein the voltage output of the control unit is formed by coupling the voltage output of the fuzzy logic control means and the previous voltage output stored in the memory.

3. The vehicle of claim 2 wherein the control unit further comprises a preprocessor for generating various fuzzy variables for the fuzzy logic control means according to the outputs of the force sensor, speed sensor, brake sensor and motor sensor and wherein the fuzzy rule sets of the fuzzy logic control means generate the voltage output of the fuzzy logic control means according to the fuzzy variables generated by the preprocessor.

4. The vehicle of claim 3 wherein the fuzzy variables include a vehicle speed and its change generated according to the output of the speed sensor, a manual force and its change, and frequency of the manual force generated according to the output of the force sensor, a motor current generated according to the output of the motor sensor, and a brake duration and its change generated according to the output of the brake sensor.

5. The vehicle of claim 3 wherein the fuzzy rule sets of the fuzzy logic control means comprises a plurality of bottom level rule sets each for evaluating the rider's satisfaction in a specific category according to the fuzzy variables and generating a correspondent voltage output, and a top level rule set for evaluating the rider's intention in each of the categories and generating a correspondent weighting factor for each category wherein each of the voltage outputs of the bottom level rule sets is multiplied by its correspondent weighting factor and the voltage output of the fuzzy logic control means is formed according to the sum of all the weighted voltage outputs of the bottom level rule sets.

6. The vehicle of claim 5 wherein the bottom level rule sets comprise an acceleration rule set for evaluating the rider's satisfaction in accelerating the vehicle, a speed rule set for evaluating the rider's satisfaction in maintaining speed of the vehicle, and a deceleration rule set for evaluating the rider's satisfaction in decelerating the vehicle, and the top level rule set is used for evaluating the rider's intention in the categories of accelerating the vehicle, maintaining speed of the vehicle, and decelerating the vehicle, and generating a correspondent weighting factor for each of the three categories.

7. The vehicle of claim 6 wherein the acceleration rule set uses the fuzzy variables generated according to the outputs of the force sensor, speed sensor and motor sensor to measure the rider's satisfaction in accelerating the vehicle.

8. The vehicle of claim 6 wherein the speed rule set uses the fuzzy variables generated according to the outputs of the force sensor, speed sensor and brake sensor to measure the rider's satisfaction in maintaining speed of the vehicle.

9. The vehicle of claim 6 wherein the deceleration rule set uses the fuzzy variables generated according to the outputs of the speed sensor and brake sensor to measure the rider's satisfaction in decelerating the vehicle.

10. The vehicle of claim 6 wherein the top level rule set uses the fuzzy variables generated according to the outputs of the force sensor, speed sensor and brake sensor to measure the rider's intention in accelerating the vehicle, maintaining speed of the vehicle, and decelerating the vehicle.

11. The vehicle of claim 1 wherein the coupling means comprises a reduction gear and a clutch for coupling the torque output of the motor to the gear transmission.

12. The vehicle of claim 11 wherein the clutch can be a one-way clutch or a two-way clutch.

13. The vehicle of claim 1 wherein the output of servo motor controlled by the control unit is restricted under a predetermined maximum torque limit.

14. A method for controlling an electrical motor aided, manually powered vehicle to assist a rider of the vehicle, the vehicle comprising:
   a gear transmission for driving the vehicle;
   a manually powered operator for receiving a manual force inputted by the rider for manual operation of the gear transmission;
   a servo motor for generating a torque output;
   coupling means for coupling the torque output of the motor to the gear transmission;
   a brake for reducing speed of the vehicle;
   a force sensor for sensing the manual force applied by the rider to the manually powered operator;

a speed sensor for sensing speed of the vehicle;

a brake sensor for sensing on and off of the brake; and a motor sensor for sensing output of the motor;

the method comprising the following steps:

1) processing the outputs of the force sensor, speed sensor, brake sensor and motor sensor to generate a plurality of fuzzy variables;

2) evaluating the rider's satisfaction in various categories by using the fuzzy variables and generating a correspondent voltage output for each of the categories;

3) evaluating the rider's intention in each of the categories and generating a correspondent weighting factor for each category;

4) multiplying the voltage output of each category by its correspondent weighting factor; and 5) generating a voltage output according to the sum of all the weighted voltage outputs to adaptively drive the servo motor to assist the rider.

15. The method of claim 14 wherein the vehicle further comprises a memory for storing a previous voltage output to the servo motor and the voltage output generated at the step 5) is coupled with the previous voltage output to control the servo motor.

16. The method of claim 14 wherein the fuzzy variables include a vehicle speed and its change generated according to the output of the speed sensor, a manual force and its change, and frequency of the manual force generated according to the output of the force sensor, a motor current generated according to the output of the motor sensor, and a brake duration and its change generated according to the output of the brake sensor.

17. The method of claim 16 wherein the acceleration rule set uses the fuzzy variables generated according to the outputs of the force sensor, speed sensor and motor sensor to measure the rider's satisfaction in accelerating the vehicle.

18. The method of claim 16 wherein the speed rule set uses the fuzzy variables generated according to the outputs of the force sensor, speed sensor and brake sensor to measure the rider's satisfaction in maintaining speed of the vehicle.

19. The method of claim 16 wherein the deceleration rule set uses the fuzzy variables generated according to the outputs of the speed sensor and brake sensor to measure the rider's satisfaction in decelerating the vehicle.

20. The method of claim 16 wherein the top level rule set uses the fuzzy variables generated according to the outputs of the force sensor, speed sensor and brake sensor to measure the rider's intention in accelerating the vehicle, maintaining speed of the vehicle, and decelerating the vehicle.

* * * * *